United States Patent [19]

Kauffman et al.

[11] Patent Number: 5,597,515
[45] Date of Patent: Jan. 28, 1997

[54] CONDUCTIVE, POWDERED FLUORINE-DOPED TITANIUM DIOXIDE AND METHOD OF PREPARATION

[75] Inventors: James W. Kauffman; Bruce R. Palmer, both of Edmond, Okla.

[73] Assignee: Kerr-McGee Corporation, Oklahoma City, Okla.

[21] Appl. No.: 534,678

[22] Filed: Sep. 27, 1995

[51] Int. Cl.$^6$ .................................................. H01B 1/00
[52] U.S. Cl. .......................... 252/520; 419/29; 419/61; 420/417; 423/82
[58] Field of Search .................... 252/518, 520; 419/29, 61; 420/417; 423/82

[56] References Cited

U.S. PATENT DOCUMENTS

| | | | |
|---|---|---|---|
| 3,022,186 | 2/1962 | Hund | 106/300 |
| 3,794,508 | 2/1974 | Winter et al. | 106/292 |
| 3,821,359 | 6/1974 | Lewis et al. | 423/610 |
| 3,859,109 | 1/1975 | Wiseman et al. | 106/300 |
| 3,956,006 | 5/1976 | Winter et al. | 106/299 |
| 4,058,393 | 11/1977 | McLaughlin | 75/1 T |
| 4,168,986 | 9/1979 | Venis, Jr. et al. | 106/291 |
| 4,780,302 | 10/1988 | Spijker | 423/464 |
| 4,990,286 | 2/1991 | Gordon et al. | 252/518 |
| 5,118,352 | 6/1992 | Noguchi | 106/436 |
| 5,124,180 | 6/1992 | Proscia | 427/255.3 |
| 5,173,386 | 12/1992 | Murasawa | 430/84 |
| 5,320,782 | 6/1994 | Okuda et al. | 252/520 |
| 5,350,448 | 9/1994 | Dietz et al. | 252/520 |

FOREIGN PATENT DOCUMENTS

| | | |
|---|---|---|
| 63-035977 | 7/1988 | Japan . |
| 1442756 | 11/1973 | United Kingdom . |
| 2115394 | 2/1982 | United Kingdom . |
| 2161494 | 7/1985 | United Kingdom . |

OTHER PUBLICATIONS

Wang et al "Photoelectrochemistry and Interfacial Engergetics of Titanium Dioxide Photoelectrodes . . . " J. Phys. Chem, vol. 94, No. 1, 1990 pp. 423–428. No Month Available.

Subbarao et al "Electrical and Optical Properties of the System $TiO_{2-x}F_x$," Inorganic Chemistry, vol. 18, No. 2, 1979 pp. 488–492. No Month Available.

*Kirk–Othmer Encyclopedia of Chemical Technology*, 3rd Ed., John Wiley and Sons, 1982, vol. 17. No Month Available.

Primary Examiner—Paul Lieberman
Assistant Examiner—M. Kopec
Attorney, Agent, or Firm—Herbert M. Hanegan; J. Rodgers Lunsford, III

[57] ABSTRACT

A process for producing a conductive, fluorine-doped titanium dioxide product which is doped throughout, said process comprising the steps of: (a) reacting the precursors in a system to form fluorine-doped $TiO_2$, said precursors consisting essentially of a titanium alkoxide and a fluorine source; (b) reducing the fluorine-doped titanium dioxide product at a temperature sufficient to form said conductive, fluorine-doped titanium dioxide product; and (c) recovering the reduced product.

28 Claims, No Drawings

CONDUCTIVE, POWDERED FLUORINE-DOPED TITANIUM DIOXIDE AND METHOD OF PREPARATION

FIELD OF THE INVENTION

The present invention relates to conductive, powdered, fluorine-doped titanium dioxide products and to precipitation processes for such products.

BACKGROUND OF THE INVENTION

A need presently exists for an electrically-conductive additive for paints, plastics, papers, and similar products which (a) will provide desirable electrostatic discharge and electromagnetic shielding properties, (b) will provide long service life, (c) is inexpensive to make and use, and (d) will enable the achievement of desired colors and/or transparency.

Carbon black, various metals, certain organic amines and amides, and doped tin oxide have been used heretofore as additives in paints, plastics, and paper products to provide desirable electrostatic discharge and/or electromagnetic shielding properties. However, these additives have significant shortcomings. Carbon black and the various metal additives used heretofore generally hinder and/or prevent the attainment of certain desirable colors and/or transparency. Products containing carbon black are also susceptible to sloughing. Organic amine and organic amide additives, on the other hand, generally have undesirably high solubilities and volatilities. Thus, products containing amine or amide additives typically have short service lives, low durabilities, and poor weather and humidity resistance characteristics. Finally, although doped tin oxide is desirably light-colored and electrically conductive, doped tin oxide is costly to produce.

Titanium dioxide is a wide band gap semiconductor which can be made conductive by doping with Group IIIA metal oxides. For example, U.S. Pat. Nos. 5,124,180 and 4,990,286 disclose a chemical vapor deposition (CVD) process for coating a substrate surface with a transparent, electrically-conductive film. The CVD process of U.S. Pat. No. 5,124,180 and 4,990,286 can be used to produce liquid crystal display devices, solar cells, electrochromic absorbers and reflectors, energy conserving heat mirrors, and antistatic coatings.

Unfortunately, conductive films such as those produced by the CVD process of U.S. Pat. Nos. 5,124,180 and 4,990,286 are susceptible to sloughing, scratching, and abrasion. Further, due to the difficulty and expense involved in coating large items and items having numerous and/or intricate surfaces, CVD processes do not provide a practical means for producing conductive plastic articles. Moreover, the type produced by the CVD process of U.S. Pat. Nos. 5,124,180 and 4,990,286 are not obtained in, and cannot be readily converted to, particulate forms which are suitable for addition to paints, plastics, papers, and other such products.

Other factors also mitigate against the commercial use of CVD-type processes. Due to the highly reactive nature of the compounds required for use in CVD-type processes, the use of such processes on a commercial scale would be quite dangerous. The use of CVD-type processes on a commercial scale would also not be cost effective since (1) the volatile compounds used in these processes are expensive and (2) only a fraction of the compound used in a CVD-type process actually reacts and deposits on the substrate. The requirement that heated substrates be used also reduces the commercial viability of CVD-type processes.

As is well known in the art, titanium oxides are produced using vapor phase oxidizing processes. Vapor phase oxidizing processes used for producing particulate titanium oxide products are generally discussed, for example, in *Kirk-Othmer Encyclopedia of Chemical Technology*, 3rd Edition, John Wiley and Sons, 1982, Volume 17, the entire disclosure of which is incorporated herein by reference.

U.S. Pat. No. 3,022,186 describes the production of titanium dioxide solid solutions using a wide variety of compounds. The patent is directed to the use of metal fluorides of magnesium, zinc, manganese(II), iron(II), cobalt(II), nickel(II) and palladium(II) to dope the lattice.

U.S. Pat. No. 3,794,508 does not relate to titanium dioxide production but describes production of a fluoride-doped metal titanate to produce a fibrous alkali metal titanate.

U.S. Pat. No. 3,821,359 discloses the use of hydrofluoric acid to dissolve titanium dioxide in order to change pigment optical properties. It is not related to doped titanium dioxide.

U.S. Pat. No. 3,859,109 describes the precipitation of coatings containing the oxides of zirconium, hafnium or titanium on titanium dioxide pigments. It does not disclose production of a fluoride-doped titania.

U.S. Pat. No. 3,956,006 discloses the use of polyvalent metal fluorides which act as habit modifiers in growth of potassium hexatitanate.

U.S. Pat. No. 4,058,393 relates to a process for recovering titanium dioxide from ores. Impure titanium dioxide is dissolved in a solution which contains fluorides. Upon precipitation, titania and titanium oxyfluoride are precipitated. The oxyfluoride is decomposed either by a thermal treatment or by reaction with steam to yield a titanium dioxide product which is essentially fluoride free.

U.S. Pat. No. 4,168,986 discloses the use of fluoride salts, such as sodium fluoride, as a substrate release material used in the preparation of lamellar pigments.

U.S. Pat. No. 4,780,302 describes a process for production of a metal fluorotitanate which is a distinctly different compound from a fluorine doped titania.

U.S. Pat. No. 5,118,352 is directed to a process for deposition of colloidal titanium dioxide on flakes of a supporting material. The supporting material can be mica or a similar substance such as fluorophologopite.

U.S. Pat. No. 5,173,386 discloses a material which is electrophotographic, i.e., the material is conductive only when illuminated. Such materials are different from fluorine doped titania which is an electronic conductor and is conductive both in the presence and absence of illumination.

In addition, the material in the '386 patent does not contain a fluoride ion after the preparation process is complete.

Japanese Patent Kokoku 63-35977 describes a product which consists of titanium dioxide with fluoride ion adsorbed on the surface of the solid. The adsorbed fluoride ion is then removed by high-temperature treatment followed by washing.

Japanese Patent 88035977 discloses an electrophotographic material, i.e., one that is conductive only in the presence of illumination by light. Additionally, this patent only describes surface doping by reaction of titanium dioxide particles with aqueous fluoride solutions.

U.K. Specification 1,442,756 refers to the application of fluorinated organic compounds to the titanium dioxide surface to reduce agglomeration of pigment during transportation and storage.

U.K. Application 2,115,394 describes the application of alumina surface coatings from an aqueous solution containing, among other ions, fluoride ion.

U.K. Application 2,161,494 relates to a process for precipitation of a pigment from an acidic or basic solution containing fluoride ion. The application does not disclose the production of a titania pigment.

The coating processes of the prior art and the products produced thereby have numerous undesirable characteristics. The oxide products produced are only surface coated. Thus, substantial conductivity losses are realized as surface attrition of the particulate product occurs. Additionally, at least two entirely separate processes are required to complete the coating methods. In the first process, a particulate product is produced and recovered. In the second process, the particulate material is fluorine treated and heat treated. Further, in comparison to the inventive process described hereinbelow, the coating processes of the prior art are very slow.

SUMMARY OF THE INVENTION

The present invention provides a process for forming a conductive, fluorine-doped, titanium dioxide product. The inventive process comprises the steps of: (a) reacting the precursors in a system to form fluorine-doped $TiO_2$; (b) reducing the fluorine-doped titanium dioxide product at a temperature sufficient to form fluorine-doped $TiO_2$ from said precursors consisting essentially of a titanium alkoxide and a fluorine source; and (c) recovering the reduced product.

The present invention also provides a conductive, fluorine-doped titanium dioxide product of the formula $TiO_{2-x}F_x$ wherein x is a value in the range of from about 0.0009 to about 0.5. The inventive product is doped throughout, i.e., there is substantially no non-fluorine-doped titanium dioxide present in the product. The inventive process comprises the step of reacting precursors in a reduction system at a temperature sufficient to form the product.

The reactants used in the inventive process preferably consist essentially of a titanium alkoxide and at least one fluorine source. The reactants most preferably consist of titanium tetraethoxide and hydrogen fluoride.

The titanium dioxide material produced by the present invention is highly conductive and lightly colored. Thus, it can advantageously be used in plastic, paints, papers, and other products for imparting electrostatic discharge and electromagnetic shielding properties, and/or for achieving colors which are not attainable when using additives such as carbon black. Additionally, the material is not susceptible to sloughing and is essentially nonsoluble and nonvolatile. Consequently, it can be used to form durable, weather-resistant products. Further, the process of the present invention provides a fast, cost-effective, one-step means for producing fluorine-doped titanium oxide material.

Unlike the product produced by the prior art methods, the product produced by the present invention is not merely conductive at the surface. Rather, each particle of the product is doped throughout. Consequently, the conductivity of the product is not substantially affected by surface attrition. Further, unlike CVD-type processes, the inventive process is essentially 100% efficient in titanium usage.

Further objects, features, and advantages of the present invention will be readily apparent upon reading the following description of the preferred embodiments.

DESCRIPTION OF THE PREFERRED EMBODIMENTS

Although the specific molecular structure of the inventive fluorine-doped, titanium dioxide product produced by the present process is unknown, the product can generally be represented by the formula $TiO_{2-x}F_x$ wherein x is a value in the range of from about 0.0009 to about 0.5 and preferably is a value in the range of from about 0.0019 to about 0.19. The fluorine content of the product, on a weight basis, obtained from the preferred fluorine content will generally be in the range of from about 0.045% to about 4.5% by weight based on the total weight of the fluorine-doped product.

The electrical conductivity of the product will generally be in the range of from about $1\times10^{-1}$ to about $1\times10^{-7}$ $(ohm-cm)^{-1}$. In the above-noted preferred fluorine content range, the conductivity of the product will generally be in the range of from about $1\times10^{-2}$ to about $1\times10^{-6}(ohm-cm)^{-1}$. In contrast, the conductivity of a non-doped particulate titanium dioxide produced by vapor phase nonoxidizing/reducing will typically be substantially less than $1\times10^{-7}(ohm-cm)^{-1}$.

The fluorine-doped titanium dioxide product of the present invention is obtained from the inventive process described herein in submicron powder form. The particle size of the inventive product will generally be in the range of from about 0.01 to about 10 micron. Thus, the inventive product is well-suited for blending with paints, plastics, papers, and other such products.

The fluorine-doped titanium dioxide product may be produced via a vapor phase or liquid phase process. The product is preferably produced by reacting a titanium alkoxide with at least one fluorine source in a reducing system at a temperature sufficient for producing a titanium dioxide product. Although a very broad range of pressure conditions can be used, the system is preferably maintained at or near atmospheric pressure. The temperature of the system should generally be in the range of from about 500° C. to about 1500° C. The system used in the inventive process is preferably maintained at a temperature of from about 700° C. to about 1100° C. Advantageously the system is maintained at the elevated temperature for a time of from about 5 minutes to about 4 hours, preferably from about 0.5 hours to about 2 hours. Preferably, before being delivered to the system, each of the reactants is preheated.

The inventive process may be conducted in a slightly reducing atmosphere. Such atmosphere can be provided by the presence of hydrogen, a hydrocarbon, carbon monoxide, mixtures thereof, or other reducing agent in the system.

In order to avoid the presence of impurities in the inventive titanium dioxide product, the titanium alkoxide used in the inventive process should be at least 99% by weight pure. The titanium alkoxide can be delivered to the system in condensed form. Alternatively, when, as discussed hereinbelow, the system includes a combustion chamber or other type of combustion zone, the fluorine-doped titanium dioxide can be produced directly in the system by feeding titanium alkoxide powder, liquid or vapor to the combustion zone. As a further alternative in cases where the system includes a combustion zone, available fluorine can be directly generated in the system by feeding a combustible fluorocarbon compound such as fluoromethanes to the combustion zone. When burned, the contained fluorine is liberated from fluoromethane or other fluorocarbon precursors.

Examples of fluorine compounds preferred for use in the inventive process include hydrogen fluoride, fluoromethanes, hexafluoropropylene, fluorinated freons, difluoroethylene, vinyl fluoride, chlorotrifluoroethylene, fluorocarbons, perfluorocarbons, and mixed halocarbons containing at least one fluorine atom. The fluorine compound preferred for use in the inventive method is hydrogen fluoride. Hydrogen fluoride is inexpensive, is efficiently used, is easily scrubbed from the process effluent gas, and can be conveniently disposed of. The fluorine-containing compound is preferably vaporized prior to being delivered to the system.

Advantageously, the process for the present invention includes the step of reducing the conductive, fluorine-doped titanium dioxide product with a reducing agent. Preferably, such reducing agent is hydrogen, a hydrocarbon, carbon monoxide, or mixtures thereof.

After the product is formed, it is advantageously recovered by precipitation from a solution. Preferably, such solution is an alcohol solution. Most preferably, such alcohol solution is ethanol.

Advantageously, the process of the present invention includes the step of drying the precipitated product. The dried product may then be decomposed. Optionally, a decomposition step may be performed which comprises heating the product at a temperature of from about 500° C. to about 1500° C. for a time of from about 5 minutes to about 4 hours, preferably from about 0.5 to about 2 hours. Preferably, the decomposition step is performed with the product under a nonoxidizing atmosphere. Most preferably, the nonoxidizing atmosphere is nitrogen containing at least a trace amount of a reducing agent such as $H_2$ or $CH_4$.

In the present invention the titania may be produced by the reaction of titanium tetraethoxide with water as shown below, $$Ti(OEt)_{4(l)} + 2H_2O_{(l)} \rightarrow TiO_{2(s)} + 4EtOH_{(aq)} \quad (1)$$

Doping occurs when fluoride is incorporated into the lattice during formation of titanium dioxide. After fluoride-doped titania is formed, this material is reduced with hydrogen to make the titania conductive.

Although not wishing to be bound by any particular theory, applicants believe development of conductivity may be understood by considering the generation of electrons which make titania conductive. Electrons are generated in undoped titania when the oxide reacts with a reducing agent, hydrogen in this case, generating electrons in the lattice and producing an oxygen vacancy, $$TiO_{2(s)} + H_{2(g)} \leftrightarrows V.''+2e^- + H_2O_{(g)} \quad (2)$$

where $TiO_{2(s)}$ represents the undoped titania lattice, and V." is a lattice defect which is an oxygen vacancy with a +2 charge with respect to the oxide ion normally present in the oxide lattice. The +2 charge with respect to the lattice is signified by ".''". The electron resides in the titanium dioxide lattice. For clarity, the titanium and oxygen atoms occupying the normal lattice positions are not shown on the product side of this reaction.

Fluoride doping occurs when a fluoride species, gaseous hydrofluoric acid in this case, and a reducing agent, react with the titania lattice introducing fluoride ions and electrons into the lattice as shown below, $$TiO_{2(s)} + 2HF_{(g)} + H_{2(g)} \leftrightarrows 2F' + 2e^- + 2H_2O_{(g)} \quad (3)$$

where $TiO_{2(s)}$ again represents the undoped titania lattice, and the electrons are present in the titanium dioxide lattice. The term F' represents fluoride ion in an oxide position. Fluorine in an oxide position has a +1 charge with respect to the oxide ion normally present in the lattice, and this charge is represented by "'". Hydrogen in reaction 3 again introduces electrons into the doped titania lattice.

The dependence of electron concentration, and hence conductivity, on the composition of the gas phase provides a quantitative illustration of the role of gaseous atmosphere in controlling conductivity in titania. Electron concentration can be found from a charge balance on the lattice which is shown below, $$2[V.''] + [F'] = [e^-] \quad (4)$$

In systems which are doped, the concentration of the doping species greatly exceed the concentration of lattice defects. Under these conditions, equation 4 becomes, $$[F'] = [e^-] \quad (5)$$

The conductivity is proportional to the concentration of electrons in the lattice, i.e., $$\text{Conductivity} \propto [e^-] = [F'] \quad (6)$$

which illustrates that conductivity increases with fluoride doping level.

The dependence of conductivity on the composition of the gaseous atmosphere can be found by substituting for fluoride concentration in equation 4 from the mass action expression for reaction 3 and solving for electron concentration. The result is, $$\text{Conductivity} \propto \frac{K^{1/4} P_{HF}^{1/2} P_{H_2}^{1/4}}{P_{H_2O}^{1/2}} \quad (7)$$

Equation 7 shows that conductivity increases with the partial pressures of hydrogen and hydrogen fluoride and decreases with the water vapor concentration.

Equations 1 and 2 show that it is not necessary to add a metal fluoride to titania to obtain the desired increase in titania conductivity. This also is consistent with the fact that it was not necessary to use metal fluorides for doping in the present work.

Any or all of the reactants used in the inventive process can be carried to the system using an inert carder gas. Examples of such gases include nitrogen and argon. As will be understood by those skilled in the art, the particle size of the inventive product will generally decrease as the amount of dilution gas present in the reduction system increases.

In order to obtain products having the conductivities and fluoride concentrations set forth hereinabove, the reactants used in the inventive process are preferably delivered to the system in amounts such that: (1) from about 0.0009 to about 0.5 mole (preferably from about 0.0019 to about 0.19 mole), expressed as atomic fluorine, of the fluorine compound(s) used in the inventive process is (are) present in the system per mole of atomic titanium.

As used herein and in the claims, the term "vapor phase nonoxidizing/reducing system" refers generally to any type of reaction system wherein the reactants used in the inventive process can be and are reacted in the vapor phase. In one preferred alternative, the vapor phase nonoxidizing/reducing system can comprise a vessel, tube, or other container which, preferably, is externally heated. In another preferred alternative, the vapor phase nonoxidizing/reducing system can comprise a vessel, tube, or other container which is, at least to some extent, directly heated by the introduction of a hot combustion gas. In addition to heating the nonoxidizing/reducing system, the combustion gas can provide at least a portion of the water needed for the inventive process.

In yet another preferred alternative, the vapor phase nonoxidizing/reducing system used in the inventive method can comprise a combustion chamber or other combustion zone wherein the process reactants are directly heated and/or vaporized. If desired, any or all of the process reactants can be added, in vapor, liquid, or fine-powder form, to the combustion flame. Alternatively, any or all of the process reactants can be added, preferably in vapor form, to the combustion zone at a point downstream of the combustion flame such that the reactants blend with, and are heated by, the hot combustion gases produced by the combustion flame.

As will be readily available to those skilled in the art, the inventive fluorine-doped titanium dioxide product can be recovered downstream of the vapor phase or liquid phase system in the same manner that non-doped titanium dioxide products are recovered from vapor phase or liquid phase systems using, for example, screens, water scrubbers, and/or bag, cloth, or ceramic filters.

The following example is presented in order to further illustrate the present invention.

EXAMPLE

Fluorine doped $TiO_2$ was prepared by reacting 14.325 g of titanium tetraethoxide with 2.279 g of a 5.7% by weight aqueous HF solution in 10 mL of absolute ethanol. The HF solution was first added to the ethanol, and then the titanium tetraethoxide was added. The mixture was stirred for four minutes at room temperature. The resulting white precipitate was not filtered but was dried at 105° C. for about 15 hours.

A control $TiO_2$ without fluorine was prepared by reacting 14.312 g of titanium tetraethoxide with 2.433 g of water in 20 mL of absolute ethanol. The water was first added to the ethanol, and then the titanium tetraethoxide was added. The mixture was stirred for four minutes at room temperature. The resulting white precipitate was not filtered but was dried at 105° C. for about 15 hours.

Both $TiO_2$ samples were loaded into ceramic crucibles and heated in a two-inch Inconel furnace tube for one hour at 900° C. A mixture of 12 mL $H_2$ and 48 mL $N_2$ was fed into the furnace tube during the one-hour reaction time. After one hour, the samples were then cooled under $N_2$ over several hours to room temperature before exposing them to the atmosphere.

The conductivity of the fluorine doped $TiO_2$ pressed powder at 2,000 psi was $9.7 \times 10^{-6} (ohm\ cm)^{-1}$. In comparison, the undoped $TiO_2$ had a conductivity at 2,000 psi of $8 \times 10^{-8} (ohm\ cm)^{-1}$.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art.

What is claimed is:

1. A process for producing a conductive, fluorine-doped titanium dioxide product which is doped throughout, said process comprising the steps of:

reacting the precursors in a system to form fluorine-doped $TiO_2$, said precursors consisting essentially of a titanium alkoxide and a fluorine source;

reducing the fluorine-doped titanium dioxide product at a temperature sufficient to form said conductive, fluorine-doped titanium dioxide product; and recovering the reduced product.

2. The process of claim 1 wherein said titanium alkoxide is selected from the group consisting of titanium tetraethoxide, titanium propoxide, titanium butoxide and titanium alkoxides containing an organic group with a titanium-oxygen bond.

3. The process of claim 1 wherein said fluorine source is selected from the group consisting of: hydrogen fluoride, fluoromethanes, hexafluoropropylene, fluorinated freons, difluoroethylene, vinyl fluoride, chlorotrifluoroethylene, fluorocarbons, perfluorocarbons, and mixed halocarbons including at least one fluorine atom.

4. The process of claim 2 wherein the titanium alkoxide is titanium tetraethoxide.

5. The process of claim 3 wherein the fluorine source is hydrogen fluoride.

6. The process of claim 1 wherein the precursors are reacted in a vapor phase system.

7. The process of claim 1 wherein the precursors are reacted in a liquid phase system.

8. The process of claim 1 including the step of decomposing the reduced product.

9. The process of claim 1 wherein said temperature is in the range of from about 500° C. to about 1500° C.

10. The process of claim 9 wherein said temperature is in the range of from about 700° C. to about 1100° C.

11. The process of claim 9 wherein said titanium alkoxide is carried to said system by an inert carrier gas.

12. The process of claim 1 wherein the product has the formula $TiO_{2-x}F_x$ and x is from about 0.0009 to about 0.5.

13. The process of claim 12 wherein x is from about 0.0019 to about 0.19.

14. The process of claim 1 wherein the product has a particle size of from about 0.01 to about 0.5 micron.

15. The process of claim 1 wherein the product has an electrical conductivity of from about $1 \times 10^{-1}$ to about $1 \times 10^{-7} (ohm\text{-}cm)^{-1}$.

16. The process of claim 15 wherein the product has an electrical conductivity of from about $1 \times 10^{-2}$ to about $1 \times 10^{-6} (ohm\text{-}cm)^{-1}$.

17. The process of claim 1 wherein the product is reduced with a reducing agent selected from the group consisting of hydrogen, a hydrocarbon, carbon monoxide, and mixtures thereof.

18. The process of claim 1 wherein the product is recovered by precipitation from a solution.

19. The process of claim 18 wherein the product is recovered from an alcohol solution.

20. The process of claim 19 wherein the product is recovered from an ethanol solution.

21. The process of claim 18 including the step of drying the precipitated product.

22. The process of claim 1 wherein the reducing step includes heating the product.

23. The process of claim 22 wherein the reducing step is performed with the product under a reducing atmosphere.

24. The process of claim 23 wherein the reducing atmosphere is selected from the group consisting of hydrogen, a hydrocarbon, carbon monoxide, and mixtures thereof.

25. The process of claim 9 wherein the elevated temperature is maintained for a time of from about 5 minutes to about 4 hours.

26. The process of claim 25 wherein the elevated temperature is maintained for a time of from about 0.5 hours to about 2 hours.

27. The process of claim 8 wherein said temperature is in the range of from about 500° C. to about 1500° C.

28. The process of claim 27 wherein said temperature is in the range of from about 700° C. to about 1100° C.

* * * * *